United States Patent

Cathey

(10) Patent No.: US 6,386,144 B1
(45) Date of Patent: May 14, 2002

(54) METHOD OF MANUFACTURING ABSORBENT MATERIAL FOR CONVERSION TO FERTILIZER

(76) Inventor: Timothy D. Cathey, P.O. Box 6343, Raleigh, NC (US) 27628-6343

(*) Notice: Subject to any disclaimer, the term of this patent is extended or adjusted under 35 U.S.C. 154(b) by 0 days.

(21) Appl. No.: 09/498,987

(22) Filed: Feb. 7, 2000

Related U.S. Application Data

(63) Continuation-in-part of application No. 09/182,488, filed on Oct. 30, 1998, now abandoned.

(51) Int. Cl.[7] ............................................. A01K 1/015
(52) U.S. Cl. ....................... 119/172; 119/171; 162/141; 264/109
(58) Field of Search ............................... 119/171, 172; 162/141, 147; D71/15; 264/109

(56) References Cited

U.S. PATENT DOCUMENTS

| | | | |
|---|---|---|---|
| 1,967,333 A | | 7/1934 | Smith ........................... 241/23 |
| 2,014,900 A | | 9/1935 | Lapp ............................ 119/171 |
| 2,708,418 A | * | 5/1955 | Sugraman et al. .............. 119/1 |
| 3,828,731 A | | 8/1974 | White ........................... 164/181 |
| 3,916,831 A | | 11/1975 | Fisher ........................... 119/173 |
| 3,980,050 A | | 9/1976 | Neubauer ....................... 119/172 |
| 4,203,388 A | | 5/1980 | Cortigene et al. ............... 119/172 |
| 4,471,717 A | | 9/1984 | Lander ........................... 119/171 |
| 4,570,573 A | * | 2/1986 | Lohman ........................... 119/1 |
| 4,676,196 A | * | 6/1987 | Lojek et al. ..................... 119/1 |
| 4,821,677 A | | 4/1989 | Harrison ........................ 119/173 |
| 5,100,600 A | | 3/1992 | Keller et al. .................... 264/112 |
| 5,372,314 A | * | 12/1994 | Manning ......................... 241/21 |
| 5,728,192 A | | 3/1998 | Andrew, Jr. ..................... 71/26 |
| 5,819,688 A | * | 10/1998 | Walker ........................... 119/169 |
| 5,900,038 A | * | 5/1999 | Wilhelm et al. ................. 71/23 |

FOREIGN PATENT DOCUMENTS

| WO | WO 97/43053 | * 11/1997 |
|---|---|---|

* cited by examiner

*Primary Examiner*—Deborah Jones
*Assistant Examiner*—Stephen Stein

(57) ABSTRACT

A method of producing an organic fertilizer from a highly absorbent animal bedding material manufactured from recycled waste paper, cotton fiber and cotton gin waste, and gypsum. The recycled waste products are combined to form a slurry mixture for processing by conventional paper making machinery into sheet material. Various chemical additives are admixed to the slurry mixture to control bacterial growth in the bedding material. The sheet material is further processed into sized particles to provide an animal bedding such as poultry litter. After the highly absorbent material is saturated with nutrient-rich animal excrement, it is subjected to chemical analysis and further processed to provide a biodegradable, organic fertilizer. The absorbent bedding material has alternative uses such as for collection of liquid chemical spills and for the remediation of such spills by biodegradation. The converted organic fertilizer can also be used as a ruminant feed after chemical analysis and the elimination of harmful microorganisms.

9 Claims, 2 Drawing Sheets

METHOD OF MANUFACTURING ABSORBENT MATERIAL FOR CONVERSION TO FERTILIZER

CROSS REFERENCE TO RELATED APPLICATIONS

This application is a continuation-in-part application of U.S. patent application Ser. No. 09/182,488 filed on Oct. 30, 1998 in the name of Timothy D. Cathey and entitled "Method of Manufacturing Absorbent Material for Conversion to Fertilizer".

FIELD OF INVENTION

The present invention relates to a method of manufacturing absorbent materials, and, more particularly, to a method of converting such materials to an organic fertilizer after usage.

BACKGROUND OF THE INVENTION

Methods for the manufacture of animal bedding products from waste paper pulp and other fibrous materials are well known to those skilled in the art. For example, U.S. Pat. No. 2,708,418 discloses an animal bedding product for use in the poultry industry that is manufactured from waste paper pulp and other chemical additives. Animal bedding material formed from such a process has high absorptivity and drying characteristics making it desirable for use as a bedding material in the poultry industry.

U.S. Pat. No. 3,828,731 to White discloses a litter or bedding material for animals and a method of making the same. The litter is biodegradable in water and soil environments and is flushable through normal household sanitary disposal systems. The litter consists primarily of high purity alphacellulose paper stock fibers in the form of pieces cut from a sheet of such material and into which has been incorporated microbial inhibitors.

U.S. Pat. No. 2,708,418 to Sugarman, et al. discloses an animal bedding material manufactured from paper pulp adapted to absorb liquids resulting from animal excrement. In this invention a pulp slurry is formed into pulp-board sheets, which are then cut and dried to the desired size into which bacterial growth inhibitors are added.

U.S. Pat. No. 2,014,900 to Lapp discloses a process of manufacturing litter suitable for poultry and livestock through the processing of cotton seed hulls, a waste product of the cotton industry. The cotton seed hulls are treated with various chemical solutions containing quinine sulfate, pine oil, turpentine, and formaldehyde to produce the litter.

U.S. Pat. No. 1,967,333 to Smith discloses an improved bedding material for poultry and animals using so-called bagasse i.e. the crushed and extracted waste from sugar-cane production, as the raw fibrous material.

U.S. Pat. No. 5,100,600 to Keller, et al. discloses a method of making an absorbent paper-containing granulate which includes mechanically comminuting paper into irregular fragments, crumpling and interlacing the fragments so as to create internal spaces therein, rough pressing the interlaced and crumpled fragments into pre-pressed tubular formations, and converting the formations into granules or pellets. The granulate material can be used as litter or as an oil binding material.

U.S. Pat. No. 5,728,192 to Andrew, Jr., discloses a method of processing fibrous waste materials, such as textile waste, in which the waste materials which are not particulate are formed into particles, and the particles are thoroughly mixed to form a waste mixture. The waste mixture has an increased temperature which allows the mixture to be used as a heat source as well as a plant growth medium.

U.S. Pat. No. 4,203,388 to Cortigene, et al. discloses an animal litter prepared by de-watering the rejects of a secondary paper fiber plant, incorporating a deodorant therein, for example, sodium bicarbonate, pelletizing, and drying.

U.S. Pat. No. 3,980,050 to Neubauer discloses a poultry litter which is absorbent but capable of giving up absorbed liquids to the atmosphere under conditions of usual use in poultry houses, such that the litter tends to be maintained dry to the touch and uncompacted. The litter is itself a body of moisture-containing crumbs formed of low density bark and cellulosic fibrous material adhered to and carried by the bark.

U.S. Pat. No. 4,821,677 to Harrison discloses a method of making animal litter having improved absorbent and deodorizing qualities which utilize ground peanut hulls, peanut shells, and finally ground natural mineral in a dry mixture. The mineral constituent provides ionic bonding for the nitrogen ions in liquid animal waste to reduce the odor of animal litter exposed thereto.

U.S. Pat. No. 3,916,831 Fisher is considered of general interest in that it discloses a system for animal excrement control which comprises the use of popcorn as a means of absorbing and/or absorbing excrement.

Finally, U.S. Pat. No. 4,471,717 to Lander is considered of general interest in that it discloses a hydrophobic substantially non-absorbent, substantially non-water wettable granular material suitable for use as a bedding for animals or for use as litter material in a waste receptacle for animals.

Notwithstanding the foregoing approaches, in the poultry field in particular the use of pine shavings has been the bedding of choice. Such shavings had heretofore been widely available and relatively inexpensive. Additionally, the shavings were highly absorbent of waste with good evaporation characteristics permitting usage for extended periods without replacement. Lately, however, newly emerging wood products have reduced the availability and increased the cost of such shavings. Moreover, the geographic distribution of poultry operations has spread to areas where the shavings are not readily available. After exhaustion of efficacy, the spent shavings have no further application and must be disposed in accordance with environmental regulations, an added cost for the poultry grower.

Accordingly, a need exists for improved bedding materials from readily available, inexpensive sources providing efficacy and longevity in use, and minimizing or avoiding expensive disposal costs.

SUMMARY OF THE INVENTION

After-much study and research into the prior art, the present invention has been developed to provide an absorbent bedding material manufactured from a combination of recycled waste paper, waste cotton material, and gypsum using a water laid process and paper manufacturing equipment. The resulting fibrous, highly absorptive material provides a useful livestock bedding material having fire resistant characteristics due to the gypsum content. The material can also be utilized in the manufacture of absorbent cloth wipes and cage liners for research animals and pets.

After the absorbent material has been utilized, for example, as poultry bedding wherein it becomes saturated with nutrient-laden excrement, it is retrieved and undergoes further processing to become an organic constituent fertilizer and soil amendment.

The absorbent bedding material of the present invention also has alternative uses such as absorbing and collecting liquid chemical spills and the remediation of such chemical spills due to its biodegradable composition.

In view of the above, it is an object of the present invention to produce a highly absorptive material made from a combination of recycled paper, cotton waste products, and gypsum for use as livestock bedding.

Another object of the present invention is to provide such an absorptive material by combining the constituent materials in a pulp slurry and forming the slurry into sheets using a water laid process and a variety of paper manufacturing equipment.

Another object of the present invention is to provide a highly absorptive material which after being deployed as animal bedding and becoming saturated with nutrient rich excrement, can be further processed into an organic fertilizer and soil amendment.

Another object of the present invention is to provide a highly absorptive animal bedding-material having alternative uses such as for collection of liquid chemical spills and for remediation of such spills by biodegradation.

Another object of the present invention is to provide a highly absorptive animal bedding material having superior performance characteristics in comparison with comparable products on the market.

Other objects and advantages of the present invention will become apparent and obvious from a study of the following description-and the accompanying drawings which are merely illustrative of such invention.

BRIEF DESCRIPTION OF DRAWINGS

The above and other objects and advantages of the present invention will become apparent upon reading the accompanying detailed description taken in conjunction with the following drawings in which.

DETAILED DESCRIPTION OF THE PREFERRED EMBODIMENTS

Figure 1:
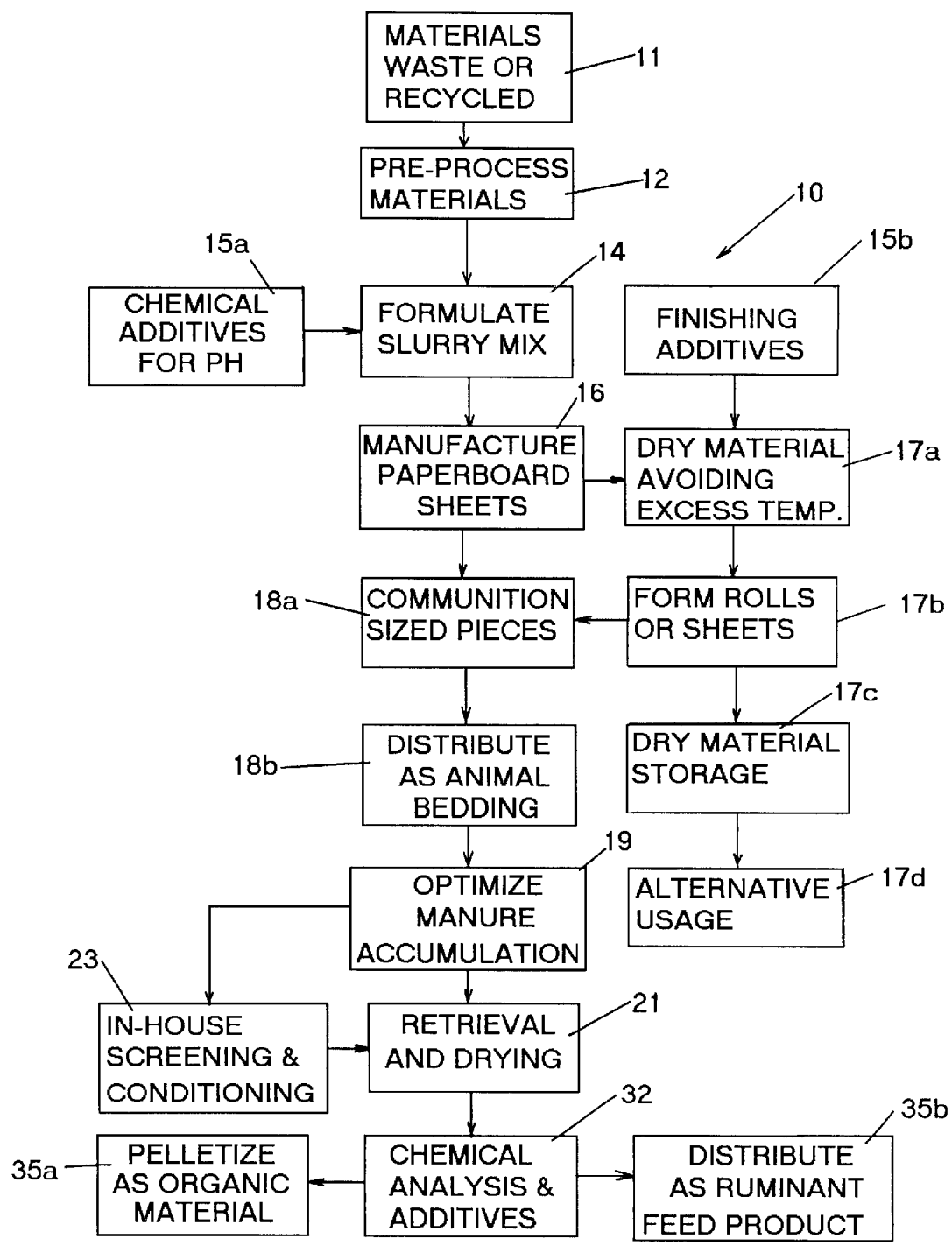
FIG. 1 is a block diagram illustrating the overall method of the present invention.

Referring to the drawings, there is shown therein a block diagram outlining the steps in the method of the present invention illustrated in FIG. 1 and indicated generally at 10 for the manufacture from waste paper, cotton and gypsum products an absorbent substrate collected at block 11.

As an initial step in accordance with the present method, sufficient quantities of a wood pulp products such as old newsprint, mixed waste paper, boxboard, corrugated board and similar materials are collected at block 11 and undergo pre-processing at block 12 to eliminate extraneous material, such as glue, hardware, excess coatings, clear windows and other foreign contaminants. A slurry mixture is formed at block 14 using the formulations described below. Additives, as required or desirable, are added at blocks 15a and 15b. The slurry is converted into sheets on papermaking machine at. block 16, dried at block 17a to a desired moisture content, and formed into rolls or sheets at block 17b. Such processed material may be inventoried at block 17c for alternative usage at block 17d, such alternative uses discussed in greater detail below. For poultry bedding and other similar applications the dry material in comminuted into appropriate shapes at block 18a and distributed as bedding at block 18b.

The material absorbs waste accumulations in use at block 19, and is subsequently retrieved and dried at block 21. From time to time during use the bedding-may-undergo screening and conditioning at block 23. Subsequent to collection, the material is analyzed and additives incorporated at block 32 for conversion to fertilizer at block 35a or ruminant feed product at block 35b.

Of course, such pre-processing operations may be carried out by the manufacturing activity or such paper waste materials may be purchased in ready-to-use bulk particles or in pelletized form.

Similarly, the cotton mill waste, gin trash, gin motes, or post consumed cotton products must be cleaned, refined and sized to a sufficient extent to remove unwanted seed hulls and plant remnants to provide the cotton fiber.

Thereafter, the resultant cotton fiber is cut to a processable in the range of 0.2 to 10 mm to provide optimum. characteristics in the finished product.

Gypsum can be obtained from recycled wallboard or in by-product form such as calcite gypsum from the manufacturer of other chemicals and must be screened and dressed to the proper particulate size. The hydrated gypsum adds flame-retardant qualities and the ability to assist in bonding nitrogen ions to reduce volatilization and loss when the finished material is being used to absorb animal excrement.

Once the above constituent materials have been obtained in sufficient quantities and pre-processed, the formulation of a slurry mixture is conducted at block 14. As described below, highly absorbent and quick drying substrates were formed using mixed waste paper in the range of 10% to 90%, cotton fiber in the range of 10% to 90%, and hydrated gypsum in the range of 2% to 75% of the dry cotton weight. In the preferred embodiment, it has been determined that a formulation of 25% to 75% mixed waste paper, 25% to 75% processed cotton waste fiber, and 10% to 45% gypsum based on the moisture free cotton fiber weight provides optimum results. The combined slurry mixture is diluted to approximately 0.25% to 20%, and preferably 1% to 10%, total solids weight in the slurry or whatever solids weight is dictated by the paper manufacturing equipment.

Of course, the constituent quantities of the above formulation can vary over a wide range of percentages depending upon the density and drying characteristics desired in the finished material. Similarly, the cotton fiber content may be varied based upon the fiber length, the degree to which the fiber is refined or hydrapulped during pre-processing, and the. absorptivity for moisture required in the finished product. The specific type of paper manufacturing equipment used to transform the slurry mixture into the finished paper sheets of the present method will dictate the slurry formulation.

Highly absorbent and quick drying sheet have been effectively processed into sheet form on conventional paper making equipment in accordance with the following examples.

EXAMPLE 1

Cotton mill waste was obtained in bale form and air-dried to yields 500 pounds dry weight. Approximately 2000 gallons of cold water were added to the mill and processed in a Tornado Pulper at a consistency of around 3 to 3.5%. After pumping into a holding tank, the slurry was uniform in appearance, with a dark gray-brown color. The slurry was transferred to a blending tank and combined with 200 pounds of gypsum plaster hydrated in a conventional hydrapulper with hot water for about 20 minutes. Thereafter, 30 bags of shredded newsprint in the amount of about 1500 dry pounds were added. The blend was transferred to a hydrapulper and diluted with warm water, 120 to 130° F., to provide a 3% to 3.5% solids slurry. The slurry was processed on paper making equipment to a thickness of 0.14 to 0.027 inch and dried to a moisture content of 6 to 10%. The resultant sheet was chopped into small pieces. When immersed in cold tap water, the pieces became saturated in 5 to 6 seconds, indicating a high rate of absorbency.

Further formulations in accordance with the above were processed in accordance with the following examples.

EXAMPLE 2

A slurry was formed comprising 85% mixed news print, 15% cotton mill waste refined a 0.3 mm clearance on a separator, 20% hydrated gypsum by weight of cotton mill waster and diluted with water to a 1% solids content was processed on wet process paper making equipment to form a 0.010 to 0.022 inch thick sheet. The sheet was comminuted into pieces and exhibited excellent moisture absorbency and drying characteristics.

EXAMPLE 3

A slurry was formed comprising 75% mixed news print, 25% cotton mill waste refined a 0.65 mm clearance on a separator, 20% hydrated gypsum by weight of cotton mill waster and diluted with water to a 1% solids content was processed on wet process paper making equipment to form a 0.025 to 0.040 inch thick sheet. The sheet was comminuted into pieces and exhibited moisture absorbency and drying characteristics comparable to Example 2.

EXAMPLE 4

A slurry was formed comprising 75% mixed news print, 25% cotton mill waste without refining, 40% hydrated gypsum by weight of cotton mill waster and diluted with water to a 1% solids content. The slurry was processed on wet process paper making equipment to form a thick sheet. The sheet was comminuted into pieces and exhibited excellent moisture absorbency and drying characteristics.

At this dilution stage it is often desirable or advantageous to admix to the slurry one or more chemical additives at block 15 which further enhance or promote the absorbency of the bedding material. In addition to or instead of absorbency enhancing additives, the present method can involve the admixture of natural disinfectants or other similar agents for the purpose of preventing mold formation and inhibiting the growth of disease-producing microorganisms. In addition, various natural deodorants, flavoring agents, pH-adjusters, and dyestuffs may be added to provide a specific characteristic.

The addition of various chemical additives to the slurry mixture is dependent upon the end use of the present material. If inhibition of bacterial growth is desired, addition of a potassium compound such as potassium hydroxide is desirable at a rate to produce a finished material with a pH of 8–9.

If the present bedding material is to be used with a pro-biotic and bacterial growth on the material, addition of potassium hydroxide is limited to produce a pH of 6.5–7.5 on average.

Other hydroxides of calcium, magnesium and potassium can be added to produce the desired pH.

In addition, other reactive compounds of the active metals can be admixed to the slurry to enhance the nitrogen bonding characteristics of the absorbent material. However, care must be taken to insure that the additives and resultant pH ranges do not contribute to skin irritation or other health problems of the livestock bedded on the present materials.

Since such chemical additives are well known to those skilled in the art, further detailed discussion of the same is not deemed necessary.

Figure 2:
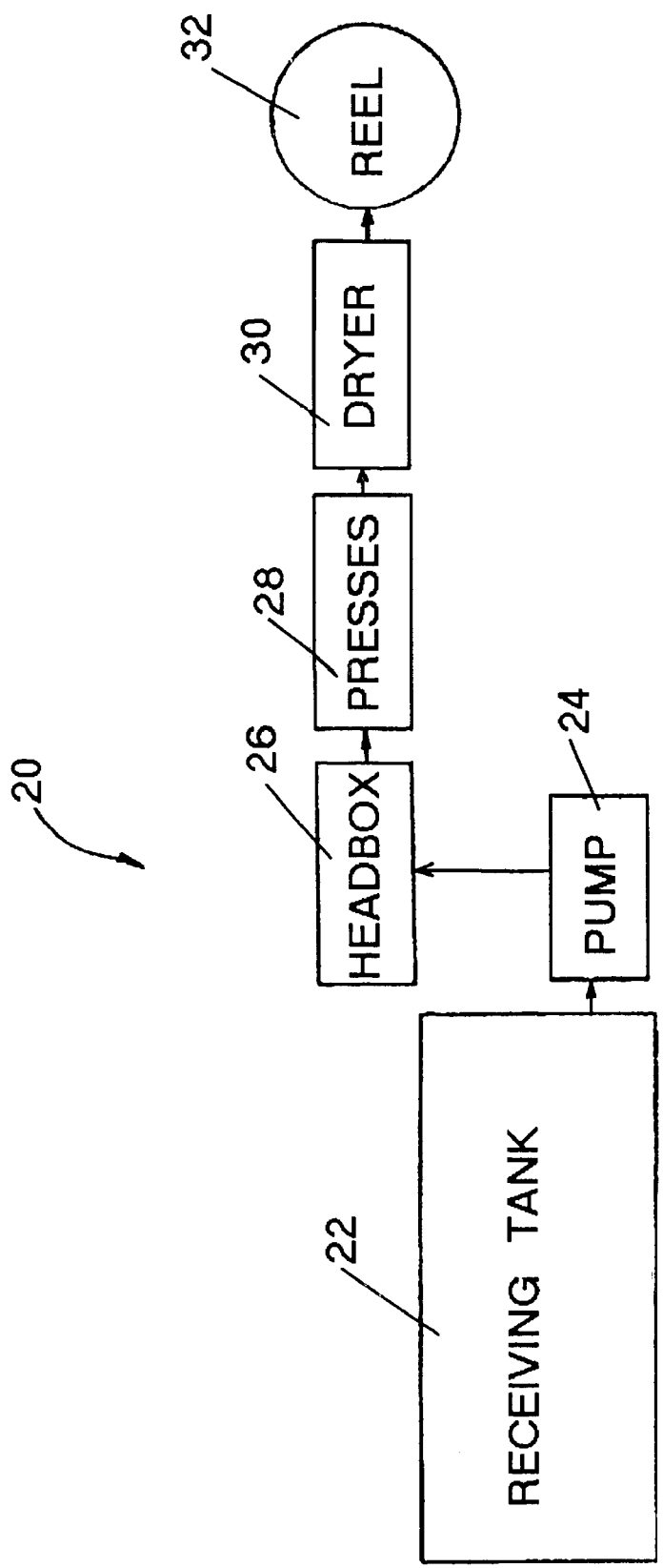
FIG. 2 is a block diagram showing the, components of the paper making equipment utilized in the present method.

As previously discussed, the slurry mixture undergoes processing in conventional paper making machinery into paperboard sheets at block 16. Referring to FIG. 2, there is shown therein a block diagram illustrating the basic components and functions of a paper making machine, indicated generally at 20. The machine 20 includes a receiving tank 22 wherein the slurry mixture is contained and agitated by a high-velocity, high volume pump 24 for the minimum time necessary to produce a homogeneous mixture to eliminate "roping" of the fibrous material into elongated strands.

A pump 24 of the type known in the industry as a Moyno progressing cavity pump is suitable for this application. In this type of positive displacement pump, there is no rotating impeller that may become fouled by the circulating cotton fibers in the slurry, which cause the unacceptable roping or stringing effect about a rotating impeller.

Of course, various other types of pumps can be used to circulate the slurry mixture and the Moyno Progressing Cavity Pump is intended to be merely illustrative and not-restrictive in any sense.

The pump 24 delivers the slurry mixture to the so-called head box 26 of the paper machine wherein the slurry mixture is formed into sheet material. It will be understood by those skilled in the art that if the thickness of the sheet material to be produced exceeds the capacity of the head box 26 a different paper machine of the type known in the industry as a cylinder machine may be utilized in the present process.

Since such paper making machines are well known to those skilled in the art, further detailed discussion of the same is not deemed necessary.

Thereafter, the sheets undergo de-watering and are conveyed to a press 28 for finishing to the desired thickness and subsequently to one or more twin-roll presses (not shown) in which the moisture content of the sheet material is reduced further by mechanical pressing.

Next, the sheet material passes across heated drying rollers 30 which cause the bulk of the moisture remaining in the sheet material to evaporate. At this stage various finishing additions may be applied to the sheet material to adjust the pH and to provide other specific characteristics described hereinabove.

Thereafter, the dried sheet material obtained using the above process is rolled on to reel 32, ready to be packed for storage or for shipment to distributors, retailers or individual users of the product.

The sheet material produced in accordance with the present method exhibits a high specific absorbency, two to eight times its weight in water, and quick drying as well as exceptional fire-resistant characteristics due to the gypsum content. In addition, the finished material has an equally desirable ability to retain its shape in sheet form facilitating shipping and handling of the material. The density of the rolled material at finished thickness is approximately 5–30 lbs. per cubic foot. This density provides a sheet material in a form that packs efficiently on a truck and, thus, the load weight capacity of the vehicle is the only limiting factor in shipping.

If the absorbent sheet material is to be utilized as poultry bedding, the finished sheets are comminuted as at 18 into flat and random shaped pieces of a predetermined size having a maximum single dimension of 0.8 inches (20 mm) and inclusive of 0.184 to 0.5 square inches single side surface area.

In the preferred embodiment generally 3-dimensional rectangular, triangular polygonal shapes or a mixture thereof having an angular fold, creates an absorbent wick with maximum loft depth using a minimum of material. In this form, the absorption rate and drying rate of the material make it an efficient poultry bedding even in reduced quantities.

The durability of the present material allows longer life of the bedding before it begins to decompose. The recommended application rate requires 0.85 lbs. per square foot which is about one-sixth the rate of conventional pine shavings, providing an obvious cost advantage.

More particularly, the standard application rate for conventional pine shavings as poultry bedding varies from 4 to 8 inches of shavings on the floor of the poultry house. The bedding material provided by the present method weighs only one third that of pine shavings. Testing of the present bedding material has indicated significant feed to weight conversion in poultry at a bedding depth of two inches, which is 0.58 pounds per square foot versus two inches of pine shavings which weigh 1.82 pounds per foot or 3.14 times the weight of the present bedding material.

The high absorbency of the present bedding material in combination with its biodegradable components and durability, permits saturation of the present material as at 19 with nutrient-rich compounds to provide an organic fertilizer and soil amendment.

After raising multiple flocks over the durable absorbent bedding material of the present invention, it can be cleaned of manure that adheres to the surface thereof by a screening device as at 23 which separates the accumulated manure and redeposits the bedding for further use.

After the optimum number of poultry flocks have passed over the present bedding material and it starts to degrade, it may be retrieved and dried as at 21 and further processed to produce an organic constituent fertilizer as at 35.

This is accomplished by the use of a high capacity vacuum device (not shown) which can efficiently remove the saturated bedding material for delivery to a microwave dryer or mineral dryer (not shown). The drying process may be carried out at the site of the poultry farm or, in the alternative, the saturated bedding material may be transported to a remote processing site.

At the completion of the drying process, the saturated material is subject to chemical analysis as at 32 and other chemical amendments may be added to balance the analysis of the organic fertilizer 35. Thereafter, the converted fertilizer is pelletized, granulized, bagged, bulk packaged or the like for shipping and distribution to contract yard services, retailers or individual users.

Further, the resultant nutrient rich material can also be utilized as a ruminant feed or dietary supplement for animals such as cows after chemical analysis and processing to eradicate harmful microorganisms.

From the above it can be seen that the method of the present invention provides an absorbent animal litter material which is comprised of recycled waste products including mixed waste paper, cotton waste, and gypsum. The constituent materials are formed into sheets using paper making equipment and converted into sized particles which serve as a bedding material in livestock operations such as poultry farming.

After becoming saturated with nutrient-rich compounds from livestock excrement, the absorbent bedding material can be further processed into an organic fertilizer and distributed to retailers or individual users.

Further, the present invention provides a versatile bedding material which may be utilized in sheet form for caged research animals or pets and in small particle sizes for use as litter for a variety of livestock animals.

In addition, the absorbent bedding material of the present invention also has alternative uses such as absorbing and collecting liquid chemical spills and the remediation of such chemical spills due to its biodegradable composition. It also functions as a weed barrier around planting beds and gardens.

Finally, the saturated animal bedding material may also be used to feed ruminant animals such as cows by careful attention to the ingredients and chemical additives used during its manufacture.

The present invention may, of course, be carried out in other specific ways than those herein set forth without departing from the spirit and essential characteristics of such invention. The present embodiments are, therefore, to be considered in all respects as illustrative and not restrictive, and all changes coming within the meaning and equivalency range of the appended claims are intended to be embraced therein.

What is claimed is:

1. A method of making an absorbent material for use as animal bedding, said method comprising the steps of:
    (a) making a mixture by weight of about 10% to 90% paper-based pulp and 10% to 90% cotton fiber processed to a fiber length of about 0.2 to 10 mm, and at least 2% hydrated gypsum based on the dry weight of cotton fiber;
    (b) adding water to said mixture to form a slurry having a solids content by weight of about 0.25% to 20%;
    (c) processing said slurry to form a substrate;
    (d) forming said substrate into discrete pieces; and
    (e) deploying said pieces for use as animal bedding.

2. The method of making an absorbing materials as recited in claim 1 wherein said mixture comprises by weight 25 to 75 percent paper pulp and 25 to 75 percent cotton fiber, and 10 to 45 percent gypsum.

3. The method as recited in claim 2 including processing said slurry on paper making machinery to a sheet substrate.

4. The method as recited in claim 1 wherein said cotton fiber is obtained from the group consisting of mill waste, gin trash, gin motes and post consumed cotton products.

5. The method as recited in claim 1 wherein said paper based pulp is obtained from the group consisting of newsprint, waste paper, boxboard and corrugated board.

6. The method as recited in claim 1 wherein said gypsum is obtained from the group consisting of recycled wallboard and calcite gypsum.

7. The method as recited in claim 1 wherein said solids content is in the range of about 1% to 10%.

8. A method of making an absorbent material from recycled waste materials for use as animal bedding, said method comprising the steps of: forming a slurry of waste paper cotton fiber waste, gypsum and water; processing said slurry with paper making machinery to form sheets of an absorbent material having 10% to 90% of said waste paper, 10% to 90% of said cotton fiber waste having a fiber length of about 0.2 to 10 mm, and 2% and 85% gypsum based on the dry weight of said cotton fiber waste; and deploying said sheets for use as animal bedding.

9. The method as recited in claim 8 including the step of forming said sheets into discrete pieces and depolying said pieces as animal bedding.

* * * * *